United States Patent [19]

Golinelli et al.

[11] Patent Number: 4,597,184

[45] Date of Patent: Jul. 1, 1986

[54] SNAP GAUGE FOR CHECKING DIMENSIONS OF WORKPIECES

[75] Inventors: Guido Golinelli; Mario Possati, both of Bologna, Italy

[73] Assignee: Finike Italiana Marposs S.p.A., S. Marino di Bentivoglio, Italy

[21] Appl. No.: 644,374

[22] Filed: Aug. 27, 1984

[30] Foreign Application Priority Data

Sep. 7, 1983 [IT] Italy ................................ 3545 A/83
Mar. 7, 1984 [IT] Italy ................................ 3371 A/84

[51] Int. Cl.⁴ .............................................. G01B 5/08
[52] U.S. Cl. ................................ 33/143 F; 33/147 H; 33/178 R
[58] Field of Search ............ 33/147 H, 147 N, 147 G, 33/147 R, 143 R, 143 H, 143 F, 147 E, 178 R, 178 D

[56] References Cited

U.S. PATENT DOCUMENTS 4,005,528 1/1977 Albertazzi ...................... 33/147 H
4,126,940 11/1978 Lendi et al. ................... 33/147 F
4,348,814 9/1982 Possati et al.

FOREIGN PATENT DOCUMENTS

3525A/81 9/1981 Italy .

Primary Examiner—William D. Martin, Jr.
Attorney, Agent, or Firm—Stevens, Davis, Miller & Mosher

[57] ABSTRACT

A snap gauge comprising support means; a substantially U-shaped integral member defining two movable arms carrying feelers for contacting a workpiece to be measured; transducer means coupled to the movable arms; and a Vee reference device for cooperating with a cylindrical surface of the workpiece. A rotatable pin couples the Vee reference device to the support means and permits adjustment of the position of the Vee reference device along a longitudinal direction. The gauge further comprises protective devices including a U-shaped element arranged internally with respect to the integral member, two protective elements coupled to radially bent ends of the U-shaped element, and two protective half-shells coupled to the support means.

30 Claims, 8 Drawing Figures

SNAP GAUGE FOR CHECKING DIMENSIONS OF WORKPIECES

BACKGROUND OF THE INVENTION

1. Field of the Invention

The invention relates to a snap gauge for checking dimensions of workpieces having a cylindrical surface, comprising: support means; reference means, substantially of Vee type, coupled to the support means for cooperating with the cylindrical surface of the workpiece; and measuring means including two movable arms arranged substantially along a longitudinal direction, two feelers coupled respectively to the ends of the movable arms for contacting the workpiece, and transducer means associated with the movable arms for providing a signal depending on the mutual distance between the feelers.

2. Description of the Prior Art

A manual electronic snap gauge, which is known from Italian patent application No. 3525A/81 of Sept. 14, 1981, comprises a substantially U-shaped metal support frame carrying a support plate supporting one or more pairs of gauging heads, arranged between the legs of the frame. A Vee reference element is fixed to the support plate for cooperating with the cylindrical surface of the workpiece. Each gauging head comprises a movable arm, carrying a feeler element for contacting the workpiece, and a position transducer.

The gauging heads, and in particular the movable arms, are mechanically protected by said legs of the support frame, by two bent legs integral with the first legs and by two metal plates fixed to the front and back sides of the frame. The first legs of the support frame protect the gauging heads mainly from impacts along the directions of mutual approach of the pairs of feeler elements and the metal plates protect the gauging heads mainly from impacts along the directions perpendicular to the directions of mutual approach of the feeler elements and to the longitudinal axis defined by the reference device.

This known gauge has a rather heavy, complex and expensive structure. In particular, the considerable weight is detrimental for the manual use of the gauge.

This known gauge is scarcely flexible, being adapted to check external diameters in a narrow measuring range.

A manual electronic snap gauge usable in different measuring ranges is also known. This snap gauge comprises a U-shaped support structure, to which there are fixed two adjustable elements or bearing pads, which perform the functions of a Vee reference, and—at the sides of the U—two "cartridge" heads, which are separately adjustable, too.

This snap gauge, too, is rather expensive and bulky. Moreover, the adjustment operations are rather long and complex and therefore require a skilled operator, especially as far as the adjustment of the two bearing elements is concerned.

Another known manual electronic snap gauge, for the rest similar to the preceding one, uses, instead of two bearing pads, a single adjustable pad having a plane bearing surface which arranges tangentially to the surface of the workpiece, along a direction parallel to the line passing through the feelers.

Therefore, the pad is not capable, by itself, of guaranteeing a symmetrical positioning of the snap gauge with respect to the workpiece in such a way that the two sides of the U-support are at equal distance from the longitudinal axis of the workpiece.

U.S. Pat. No. 4,348,814 to Possati et al discloses a manual plug gauge for checking diameters of holes, including an arm-set substantially obtained from a single member of bent spring-steel plate having two lightened sections defining relevant rotation axes and two measuring arms movable about said rotation axes. The member is coupled to a ring body to which also are coupled a handle and a nose-piece which protects the arm-set and provides centering of the gauge with respect to the hole to be checked.

It is evident that most of the structure of this known plug gauge cannot be used for constructing a snap gauge.

SUMMARY OF THE INVENTION

An object of the present invention is to provide a snap gauge having a very simple, cheap and light structure which, however, guarantees high accuracy, repeatability of the measurements and very good sturdiness.

Another object of the invention is to provide a snap gauge having adjusting means which permit, through simple and fast operations, use of the gauge for checking workpieces having cylindrical surfaces with nominal dimensions within different ranges.

A further object of the invention is to provide a snap gauge having a movable particularly simple and rugged arm-set.

Still another object of the invention is to provide a snap gauge having protective means of a very simple, cheep and light structure, which, however, guarantee an effective protection for the more delicate components of the gauge.

According to one feature of the present invention, a snap gauge is provided with a movable connecting and adjusting element for coupling Vee reference means to support means and for permitting adjustment of the position of the Vee reference means along a longitudinal direction.

According to another feature of the present invention, a snap gauge comprises an integral member, substantially U-shaped, having a support base, two resiliently deformable portions defining two rotation axes and two legs defining relevant movable arms. Moreover, a protective element, substantially U-shaped, is substantially arranged internally with respect to the integral member.

According to a further feature of the present invention, a snap gauge comprises protective means including two half-shells coupled to support means of the gauge and defining an envelope with a front surface, a rear surface and two external side surfaces.

BRIEF DESCRIPTION OF THE DRAWINGS

Two preferred embodiments of the invention are now described in detail with reference to the annexed drawings, which however are to be only considered as non limiting examples.

DESCRIPTION OF THE PREFERRED EMBODIMENTS

Figure 1:
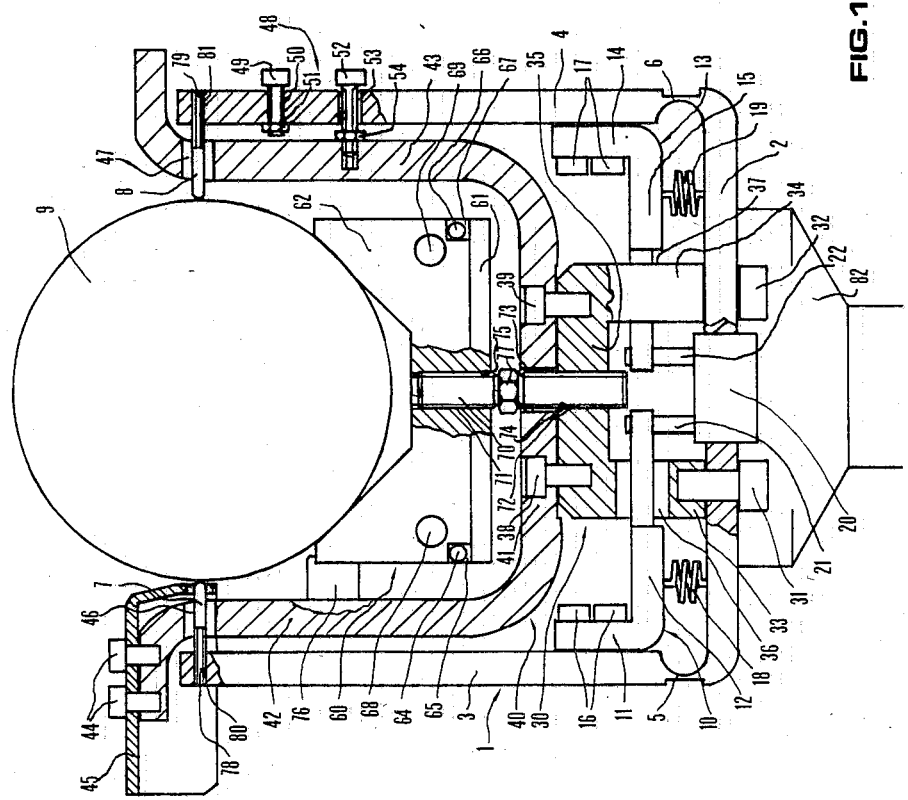
FIG. 1 is a front elevation of an electronic snap gauge, with some details in cross-section and other details omitted for simplicity's sake, according to a preferred embodiment of the invention.

The electronic snap gauge of FIG. 1 comprises an integral member or element 1, having substantially a U-shape. Support means of the gauge comprise the base 2 of the U-shaped member 1, while measuring means of the gauge i.e. the arm-set, comprise two movable measuring arms defined by the two legs 3 and 4 of the U-shaped member 1.

The thickness of integral member 1 is reduced in the portions 5, 6, which connect arms 3 and 4 to base 2; these two portions 5, 6, which are resiliently deformable, are parts of the measuring means because they define two geometric axes of rotation, which are perpendicular to the plane of FIG. 1. Arms 3 and 4, respectively, can perform angular movements about these axes, with respect to base 2. Fixed to the free ends of arms 3 and 4 are two feelers or feeler elements 7 and 8, for contacting the workpiece to be checked 9, which includes a cylindrical surface.

Integral member 1 defines a first plane of symmetry coinciding with the cross-section plane of FIG. 1, and a second plane of symmetry perpendicular to the plane of FIG. 1 and passing through the geometrical longitudinal axis defined by integral member 1.

Two connecting elements 10, 13, substantially L-shaped, have their smaller legs 11, 14 fixed to arms 3 and 4, respectively, in proximity of reduced portions 5 and 6. The coupling is obtained by pairs of screws 16 and 17, or alternatively by welding.

The other legs 12 and 15 of elements 10 and 13 define together a plane of symmetry coinciding with those defined by integral element 1 and take a position substantially parallel to base 2, because their measurement displacements about the axes defined by portions 5 and 6 have small amplitude.

Fixed to leg 12 is the end of a tension spring 18, which applies a force biassing the leg 12 toward base 2, where is fixed the other end of the spring; this force is transmitted to arm 3, for making it rotate clockwise, and keeps feeler 7 in contact with the workpiece to be checked 9.

A spring 19, arranged between leg 15 and base 2, acts in a similar and symmetrical manner.

Fixed at the center of base 2 and arranged on a single block 20 are the windings of transducer means, i.e. of two transducers of the differential transformer type; the two cores of the transducers, not visible in the figure, are supported by two stems 21 and 22 fixed next to the ends of legs 12 and 15 respectively. Therefore, stems 21 and 22 and the relevant cores are movable substantially along the longitudinal direction of the gauge.

In block 20, the outputs of the two transducers are connected in summing arrangement, in such a way to provide directly a single output electric signal indicative of the sum of the displacements of feelers 7 and 8 from a zero position, when the feelers come into contact with the workpiece to be checked 9.

The transducers are connected, through cables, to a power-supply, processing and indicating unit, these features not being visible in the figure.

A bridge-shaped intermediate element 30, being part of the support means of the gauge and having the shape of an overturned U, has its ends fixed to base 2, through screws 31 and 32, symmetrically arranged at the sides of block 20.

The two uprights 33 and 34 of intermediate element 30 have through holes 36 and 37, along the transversal direction defined by base 2. These holes 36, 37 permit the passage, with considerable play, of legs 12 and 15.

Also the portion 35 which connects uprights 33 and 34 to each other is parallel to base 2. Fixed onto this portion 35, through screws 38 and 39, is the base 41 of a first protective element 40 which substantially has, too, a U-shape.

This protective element 40 has a plane of symmetry coinciding with that defined by integral member 1 and is housed within the latter, with its legs substantially parallel to the legs of the integral member 1. The legs 42, 43 of element 40 have their ends oppositely bent and arranged externally with respect to the ends of movable arms 3, 4, for protecting movable arms 3 and 4 from impacts substantially along a longitudinal direction and for permitting to fix, through screws 44, guiding devices 45 (only one of which is shown in the figure) adapted to make easier the insertion of workpiece 9 to be checked between feelers 7, 8. Guiding devices 45 are also part of the protective means of the gauge because they define two additional protective elements protecting the movable arms 3, 4 from impacts substantially along the longitudinal direction. Two through holes 46 and 47 permit feelers 7 and 8 to pass through element 40, with large play.

The gauge comprises limiting elements defining a device 48—for limiting the angular displacement of arm 4—arranged between leg 43 of element 40 and movable arm 4. A screw 49 is fixed to arm 4 through a threaded hole 50 and a locking nut 51, for limiting the displacement in the measurement direction; in this way, after a determined counterclockwise rotational displacement of arm 4, the end of screw 49 abuts against leg 43, thus preventing further displacements of arm 4 in the measurement direction. For limiting the displacements in the opposite direction, a screw 52, longer than screw 49, passes through arm 4, within a through hole 53, with a determined play, and is screwed to leg 43 and locked by a nut 54.

In this way, after a determined rotational displacement of arm 4, in a clockwise direction, the same arm 4 abuts against the head of screw 52, and is prevented from continuing its displacement in the direction opposite to the measurement direction.

A limiting device similar to that which comprises screws 49 and 52 is arranged between arm 3 and leg 42, although it is not shown in the figure.

Reference means for centering the workpiece 9 with respect to the gauge are constituted by a device or structure 60 arranged internally with respect to element 40 and directly fixed to bridge element 30, in an adjustable manner which shall be described later.

Figure 2:
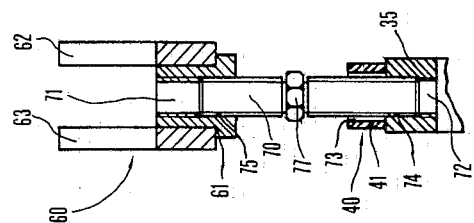
FIG. 2 is a cross-section, according to a plane perpendicular to the plane of FIG. 1, of a Vee reference device of the gauge of FIG. 1 in a different operating position.

This structure 60, also shown in FIG. 2, essentially consists of three parts: a block 61, having a substantially elongated shape in a transverse direction, and two flat Vee elements 62 and 63, fixed in two grooves obtained in two opposite long sides of block 61.

Element 62 is centered on a side of block 61 by abutments 64, 66 of the block, which cooperate with the surfaces of suitable seats 65, 67 of element 62. The fixing is obtained through screws 68, 69.

In a similar way, not shown in the figures, element 63 is centered and fixed to the opposite side of block 61.

Structure 60 is fixed to element 30 by means of a connecting and adjusting element consisting of a threaded pin 70—arranged along the longitudinal axis of the gauge—which threadedly engages, at its ends, two threaded through holes 71 and 72 of block 61 and portion 35, respectively. The screw threads of holes 71 and 72 are, respectively, right and left.

A through hole 73 of base 41 permits pin 70 to pass through element 40.

Arranged approximately in the intermediate portion of pin 70 and integral therewith is a nut 77 enabling an operator to rotate, by means of a wrench, the pin 70 about its axis.

Pin 70 is secured into holes 71 and 72 by means of self-locking thread inserts, in particular a right thread insert 74 is used for the coupling with element 30, and a left thread insert 75 for the coupling with reference structure 60.

Guide means are provided for guiding the reference structure 60 along the longitudinal direction. In particular, fixed to the internal side of leg 42 of element 40 is a guide pin 76, which is partially arranged within the reference structure 60, in particular in a hollow space between flat elements 62 and 63.

Feelers 7, 8 are fixed within threaded holes of arms 3, 4 by means of two threaded stems 78, 79 and self-locking thread inserts 80, 81. Therefore it is possible to adjust the radial position of feelers 7, 8.

A handle 82 is fixed, in a way not shown, to base 2.

The manner of operating of the gauge is as follows.

At first, the gauge is zero-set on a cylindrical master part having diameter equal to the nominal diameter of the parts 9.

The zero setting operation consists, mainly, in adjusting the position of reference structure 60, which contacts the master part, by approaching or moving it away with respect to the line passing through the two feelers 7 and 8, until the line passing through feelers 7, 8 is arranged according to the diametral direction of the master part while the Vee elements 62, 63 are in contact with the master part.

The vertical displacement of structure 60 is obtained by manually operating nut 77; in fact, by rotating this nut 77, the whole threaded pin 70, integral with it, also rotates; structure 60 would rotate too, but the particular arrangement of guide pin 76 prevents this movement.

Structure 60 is therefore constrained to perform a translation displacement along the axis defined by threaded pin 70 (i.e. along the axis of the gauge), in either direction depending on the rotation direction of nut 77.

It must be considered that, in case the nominal diameter of the workpiece 9 to be checked does not permit a reliable centering on structure 60, it is very easy to replace the Vee elements 62 and 63 by similar elements with a different opening, i.e. with a different angle of the Vee sides.

Of course, also in case of wear of those portions of structure 60 with contact the workpiece, it is very easy and convenient to replace the flat elements 62 and 63, while maintaining in place block 61.

After having adjusted the position of the structure 60, the mechanical zero-setting is continued by displacing feelers 7 and 8 with respect to arms 3 and 4 until an indication close to zero is obtained in the power-supply, processing and indication unit. Then, an electrical zero-setting operation, by means of a potentiometer of the power-supply, processing and indicating unit, permits obtaining an exact indication of zero value.

Afterwards, the gauge is manually applied onto a workpiece 9 to be checked, for example a shaft.

The approach of the gauge towards the workpiece 9 is guided by device 45 and the other guide device fixed to leg 43. These guide devices can be replaced with similar guide devices having dimensions suitable for the nominal diameter of the workpiece 9, or alternatively the guide devices can be made so as to permit radial adjustments, depending on the diameter of workpiece 9.

When the Vee sides of structure 60 touch part 9, feelers 7 and 8 are arranged substantially in correspondence with two diametrically opposite generating lines of shaft 9 and the gauge detects the deviation of the diameter of shaft 9 with respect to the diameter of the master part.

FIGS. 3 to 8 show another preferred embodiment of the invention. In FIGS. 3 to 8 elements substantially similar to those comprised in the embodiment of FIGS. 1 and 2 are denoted by the same signs prefixed by the number 2 (and by the numbers 2 and 0 for the signs 1 to 9). Moreover, in FIGS. 3 and 4 some elements substantially similar to those of the first embodiment, such as the transducer means and the guiding devices, are more detailedly illustrated.

Figure 3:
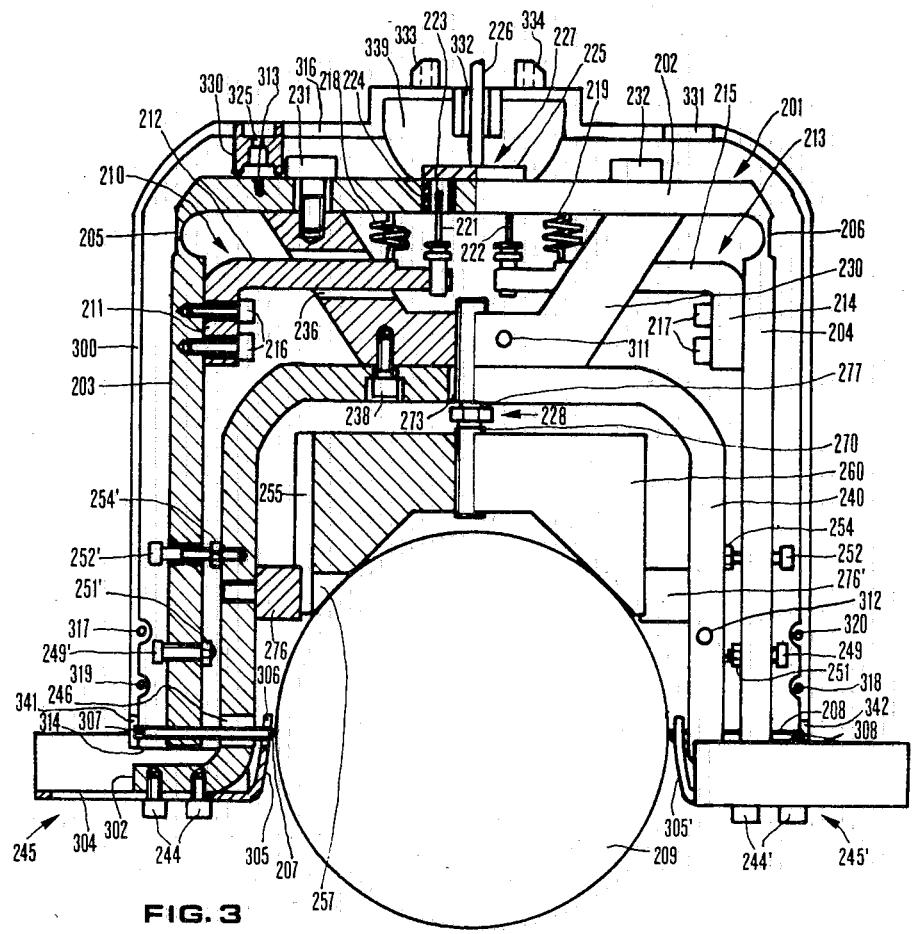
FIG. 3 is a front elevation, with the left side cross-sectioned, of a snap gauge, according to another preferred embodiment of the invention, shown without one protective half-shell and without the handle.

In particular, as shown in FIG. 3, a differential transformer position transducer 227 has two shafts or stems 221, 222 fixed at the ends of legs 212, 215 and perpendicular to these legs 212, 215, so that stems 221, 222 displace substantially along the direction of the longitudinal axis of the gauge. Stems 221, 222 carry at their free ends magnetic cores movable within windings housed in seats defined by base 202. In FIG. 3 only a core 223 and the relevant windings 224 are visible. Moreover, transducer 227 comprises a board 225 supporting electric circuits, not shown, which sum the output signals of windings 224 and of the other windings which are not visible. A cable 226 connects the circuits of board 225 to a power supply and indicating unit, not shown, which detects and displays the deviation of the diameter of workpiece 209 with respect to the diameter of a master part used for performing a zero setting operation of the gauge.

Figure 4:
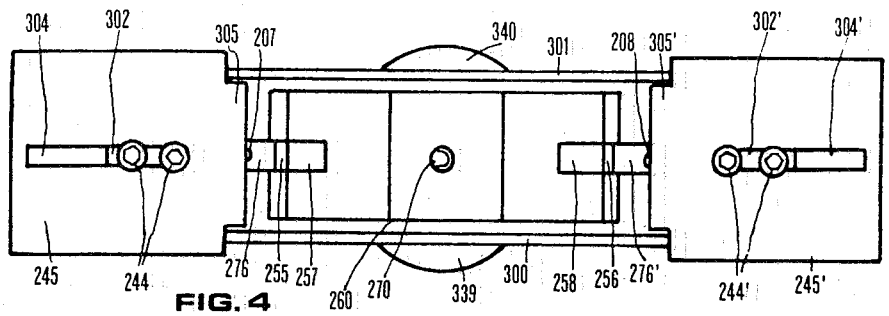
FIG. 4 is a bottom plan view of the snap gauge of FIG. 3, also including the front protective half shell.
Figure 8:
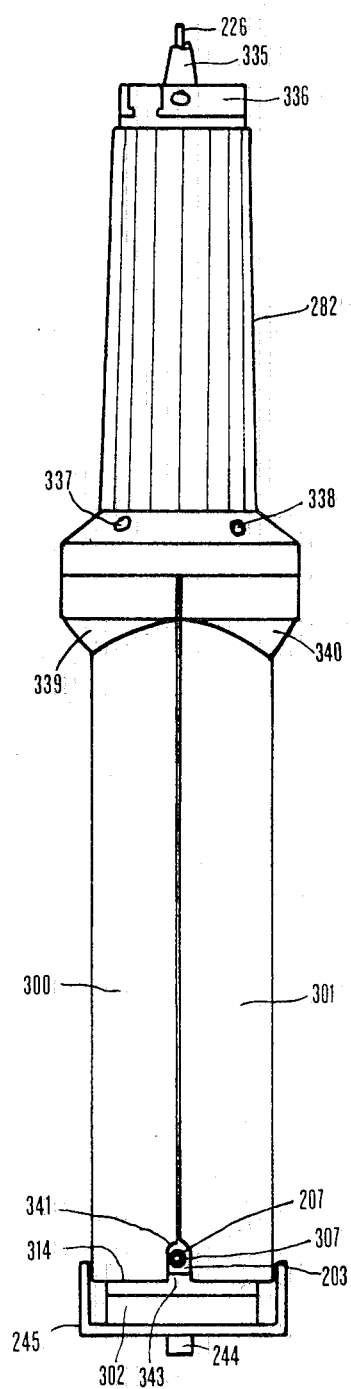
FIG. 8 is a side view of the gauge of FIGS. 3-7, provided with the handle and the protective half shells.

The protective means of the gauge comprise guiding devices or elements 245, 245', visible in FIGS. 3, 4 and 8, fixed at the bent ends 302, 302' of the first protective element 240, U-shaped, by pairs of screws 244, 244'. These elements 245, 245' include channel portions, with longitudinal slots 304, 304' in the intermediate side, and bent internal wings 305, 305' which define openings—only one of which, 306, is visible in FIG. 3—for the passage of the internal ends of feeler elements 207, 208. Feeler elements 207, 208 are fixed at the ends of movable arms 203, 204 by threaded couplings including self-locking thread inserts and have external ends 307, 308 permitting, by means of a wrench, the adjustment of the radial position of feeler elements 207, 208 depending on the nominal diameter of workpiece 209.

A bridge shaped intermediate element 230 being part of the support means of the gauge has substantially a U-shape with divergent legs or uprights and a threaded pin 270 is coupled to intermediate element 230 through a threaded coupling. Pin 270, together with a Vee block 260 and guide means including guide elements or pins 276, 276', provides reference means 228 adjustable in the same way described with reference to the embodiment of FIGS. 1 and 2.

However, differently from the structure 60 of FIGS. 1 and 2, block 260 is made of a single piece and defines, at its sides, two grooves or longitudinal guides 255, 256 providing sliding seats for guide pins 276, 276', which are rigidly locked to the sides of protective element 240.

Moreover, block 260 defines, in correspondence with the lower ends of the support or reference surfaces, two openings 257, 258 which permit the passage of feeler elements 207, 208 when the reference means 228 are adjusted for checking workpieces 209 having the smallest permissible values of nominal diameter.

In the gauge of FIG. 3, during the mechanical zero setting operations, the radial positions of elements 245, 245' are adjusted by unlocking screws 244, 244' and by causing sliding of elements 245, 245', along slots 304, 304', in order that the internal ends of feeler elements 207, 208 protrude slightly with respect to wings 305, 305'.

In this way, bent wings 305, 305' act as guides for the insertion of block 260 onto workpiece 209 and as additional protective elements providing a protection against impacts which cause the feeler elements 207, 208 to move apart from each other.

Therefore, the stresses originated by possible longitudinal or radial impacts against elements 245, 245' do not appreciably affect the movable arm-set because these stresses are mostly applied to sensibly rigid elements, i.e. to element 240 and base 202.

The protective devices comprised in the gauge according to FIGS. 3 to 8 comprise, in addition to elements 240, 245, 245', two half shells 300, 301, made of plastic material.

Half shells 300, 301 can be fixed, by means of screws, to opposite sides of elements 230 and 240. Reference signs 311 and 312 denote threaded holes obtained for this purpose in elements 230 and 240.

Moreover, half shells 300 and 301 can be locked, by other screws, to base 202, which defines relevant threaded holes, one of which is denoted by reference sign 313.

Figure 6:
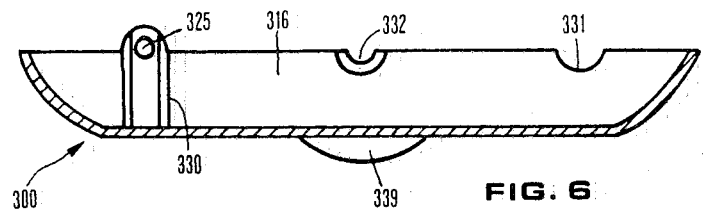
FIG. 6 is a horizontal cross-section of the half shell of FIG. 5, according to the path VI—VI of FIG. 5.
Figure 5:
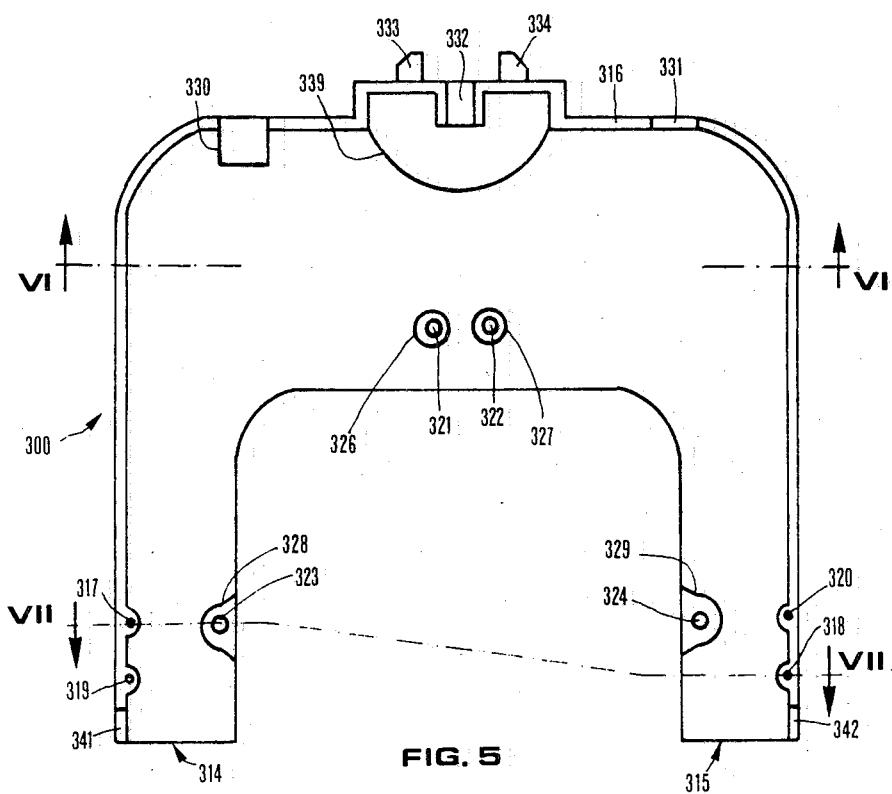
FIG. 5 is a back view of a protective half shell of the gauge of FIGS. 3 and 4.
Figure 7:
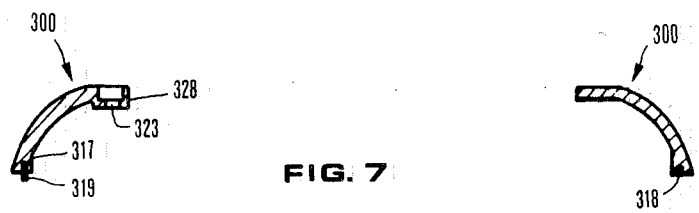
FIG. 7 is a horizontal cross-section of the half shell of FIG. 5, according to the path VII—VII of FIG. 5.

Half shells 300 and 301 are symmetrical with respect to each other and therefore only half shell 300 shall be described with particular reference to FIGS. 5 to 7.

Half shell 300 has substantially a U-shape, with two lower bases 314, 315, substantially open, adjacent at opposite sides (along the longitudinal direction) to feeler elements 207, 208 and to the ends of element 240, and with an upper base 316 defined by a bent wing. Between the legs of the U defined by half shell 300 there is an open space permitting the insertion of workpiece 209 onto the reference surfaces of block 260 and permitting the access to block 260 and nut 277.

The legs of the U defined by half shell 300 are formed by flat internal wings and bent external wings adjacent to movable arms 203, 204; the external wings include strengthened portions where there are obtained holes 317, 318 and pins 319, 320 which cooperate with corresponding pins and holes of the other half shell 301, for bettering the mutual coupling of half shells 300, 301.

This coupling is performed, as mentioned before, by detachable couplings including screws, not visible, which—by passing through holes of half shells 300, 301—engage threaded holes, such as holes 311, 312, 313, obtained in elements 230, 240 and in base 202. In particular, half shell 300 has strengthened portions 326, 327, 328, 329, 330 defining holes 321, 322, 323, 324 and 325. An opening 331 is provided for housing the strengthened portion of half shell 301 corresponding to strengthened portion 330.

The central portion of the upper base 316 of half shell 300 is shaped so as to define a seat 332 for the passage of cable 226 and two juts 333, 334 for coupling with corresponding recesses, not visible, obtained in the lower end of a handle 282, shown in FIG. 8.

Cable 226 comes out from the upper end of handle 282 through a cable sheathing 335 and is clamped by a cable clamp 336.

The lower end of handle 282 has four holes, two of which 337, 338 visible in FIG. 8, for the passage of screws which, by engaging into threaded holes obtained in juts 333, 334 and in the corresponding juts of half shell 301, permit handle 282 to be fastened to half shells 300, 301.

Moreover, half shell 300 defines, in correspondence with the intermediate portion of upper base 316, a convex connecting and stiffening portion 339. A similar portion 340 is defined by half shell 301, as shown in FIG. 8.

Two recesses 341, 342 are obtained in correspondence with the lower ends of the external wings of the legs of the U defined by half shell 300. Accordingly, when half shells 300, 301 are assembled, they define an envelope or cover having, at its external side surfaces, two openings—one of which, 343, is visible in FIG. 8—which permit access to the external ends 307, 308 of feeler elements 207, 208, for carrying out radial adjustments of the feeler elements 207, 208.

Consequently, the envelope provided by half shells 300, 301 comprises a front surface, a rear surface and two external side surfaces, which define a space wherein are housed the most delicate components of the gauge, namely integral member 201, feeler elements 207, 208 (only the internal ends of feeler elements 207, 208 protrude) and transducer 227. Therefore movable arms 203, 204, portions 205, 206, feeler elements 207, 208 and transducer 227 are effectively protected from impacts along the directions of mutual approach between feeler elements 207, 208 and from impacts perpendicular to these directions and to the longitudinal geometric axis of the reference means 228.

Additionally the envelope defined by half shells 300, 301 comprises two lower end bases, substantially open, adjacent to feeler elements 207, 208 and to the ends of element 240 and a third upper end base substantially closed, whereto is fixed handle 282.

Basically, half shells 300, 301 act only as protective devices. In fact, their function of support for handle 282 does not require a considerable stiffening of half shells 300, 301, because the mutual position of handle 282 and of the arm set of the gauge need not to remain exactly defined and constant. However, by simple modifications, handle 282 can be possibly secured to base 202 of integral member 201.

Therefore half shells 300, 301 can be of light material, but resisting to impacts, with restricted thickness of the walls. Some elasticity in the half shells 300, 301 is not detrimental, because it permits better taking up of possible impacts. The use of plastic material for the half shells 300, 301 is also advantageous because it provides a good heat insulation.

Another advantage resides in the ease and quickness of the operations for assembling and disassembling the half shells 300, 301. As shown in FIGS. 3, 4 and 8, the sides of the channel shaped portions of elements 245 and 245' protrude along the direction of the longitudinal axis of the gauge, in such a way as to enclose, with small play, the lower ends of half shells 300 and 301. Consequently, these channel shaped portions prevent the opening of half shells 300, 301 as a consequence of impacts against the external wings of the half shells. Thus, in substance, the channel shaped portions of elements 245 and 245' provide additional locks for half shells 300 and 301, for taking up—at least partially—stresses deriving from resilient deformations of half shells 300, 301 caused by said impacts.

Elements 201, 210, 213, 230 and 240 (as well as the corresponding elements 1, 10, 13, 30 and 40 of the embodiment of FIGS. 1 and 2) can be obtained by processing (through bending operations, and metal cutting operations for obtaining holes, threads and portions 205, 206 or 5 and 6) five flat bars of steel, and therefore their cost is rather low.

Through simple modifications, regarding basically integral member 1 or 201, the gauges can be used for checking, for example, the axial distance between two flanges of a shaft.

What is claimed is:

1. A snap gauge for checking dimensions of workpieces having a cylindrical surface, comprising support means; reference means with a Vee reference device for cooperating with the cylindrical surface of the workpiece; connecting means for coupling the reference device to the support means; and measuring means with two feelers movable with respect to the support means, substantially along a transversal direction, for contacting the workpiece, and with transducer means associated with the feelers for providing a signal depending on the distance between the feelers, wherein the connecting means comprise a movable connecting and adjusting element for coupling the Vee device to the support means and for permitting adjustment of the position of the Vee device along a longitudinal direction.

2. The snap gauge according to claim 1, further comprising guide means cooperating with the support means and the Vee device, for guiding the Vee device along said longitudinal direction.

3. The snap gauge according to claim 2, wherein said movable connecting and adjusting element comprises a pin arranged along said longitudinal direction, the pin being associated, through threaded couplings, with the Vee device and with the support means.

4. The snap gauge according to claim 3, wherein said guide means comprise a guide pin fixed to the support means, the Vee device defining a longitudinal seat for housing a free end of the guide pin.

5. The snap gauge according to claim 3, wherein said threaded couplings comprise self-locking thread inserts.

6. The snap gauge according to claim 1, comprising an integral member having substantially a U-shape, the integral member including a base being part of the support means, two resiliently deformable portions defining two rotation axes and two legs defining movable arms rotatable about said rotation axes, wherein the deformable portions and the movable arms are parts of said measuring means and the feelers are adjustably fixed to the free ends of the movable arms, the support means further including an intermediate element fixed to the base of the integral member and coupled to the connecting and adjusting element, and wherein the gauge further comprises a protective element substantially U-shaped, fixed to the intermediate element, internally with respect to the integral member.

7. The snap gauge according to claim 6, further comprising two connecting elements, substantially L-shaped, respectively fixed to the measuring arms and wherein said transducer means comprise two transducers having first elements fixed to the base of the integral member and second elements fixed to the L-shaped connecting elements, the second elements of the transducers being movable substantially along said longitudinal direction.

8. The snap gauge according to claim 6, further comprising a handle fixed to the support means, for the manual use of the gauge, and two protective half-shells fixed to the support means for defining a substantially closed envelope having a front surface, a rear surface and two external side surfaces for protecting the measuring means from impacts substantially along said transversal direction and from impacts substantially along a direction perpendicular to the transversal direction and to the longitudinal direction.

9. The snap gauge according to claim 6, wherein said protective element has two bent ends arranged externally with respect to the free ends of the movable arms for protecting the movable arms and the feelers from impacts along said longitudinal direction and wherein the gauge further comprises two additional protective elements coupled to said bent ends for protecting the movable arms and the feelers from impacts along said longitudinal direction, the additional protective elements being adjustable, with respect to said bent ends, substantially along said transversal direction and defining relevant portions for facilitating the insertion of the gauge onto the cylindrical surface of the workpiece to be checked.

10. The snap gauge according to claim 1, wherein said Vee device comprises a block coupled to the movable connecting and adjusting element and at least a Vee element detachably fixed to the block.

11. A snap gauge for checking dimensions of workpieces having a cylindrical surface, comprising: support means; reference means, substantially of Vee type, coupled to the support means for cooperating with the cylindrical surface of the workpiece; measuring means including two movable arms arranged substantially along a longitudinal direction, two feelers coupled respectively to ends of the movable arms for contacting the workpiece, and transducer means associated with the movable arms for providing a signal depending on the mutual distance between the feelers; and protective means coupled to the support means, wherein the measuring means include an integral member, substantially U-shaped, having a base being part of the support means, two resiliently deformable portions defining two rotation axes and two legs, defining said movable arms, rotatable about said rotation axes, and wherein said protective means include a first protective element, substantially U-shaped, substantially arranged internally with respect to said integral member.

12. The snap gauge according to claim 11, wherein said first protective element has two bent ends arranged externally with respect to said ends of the movable arms, for protecting the movable arms from impacts substantially along a longitudinal direction.

13. The snap gauge according to claim 12, wherein the reference means comprise a Vee device longitudinally adjustable with respect to the support means, said first protective element supporting guide elements for longitudinally guiding the Vee device.

14. The snap gauge according to claim 13, wherein the feelers are adjustably coupled to the movable arms, and wherein the protective means further include two additional protective elements adjustably coupled to the bent ends of the first protective element for protecting the movable arms from impacts substantially along the longitudinal direction and for facilitating the insertion of the workpiece.

15. The snap gauge according to claim 11, further comprising two pairs of limiting elements operatively coupled to the movable arms and the first protective element for adjustably limiting the displacements of the movable arms in the measurement direction and in the opposite direction.

16. The snap gauge according to claim 14, wherein the first protective element and the additional protective elements define relevant openings for the passage of the feelers.

17. The snap gauge according to claim 11, wherein the support means comprise an intermediate member fixed to the base of the integral member, the first protective element being fixed to the intermediate member.

18. The snap gauge according to claim 17, wherein the integral member, the first protective element and the intermediate member are obtained from bent flat bars of steel.

19. The snap gauge according to claim 17, further comprising two connecting elements, substantially L-shaped, respectively fixed to the movable arms, and two springs arranged between relevant legs of the connecting elements and the base of the integral member for urging the feelers against the workpiece.

20. The snap gauge according to claim 19, wherein said transducer means comprise two transducers having first elements fixed to the base of the integral member and second elements fixed to the L-shaped connecting elements, the second elements of the transducers being movable substantially along said longitudinal direction.

21. A snap gauge for checking dimensions of workpieces having a cylindrical surface, comprising: support means; reference means, substantially of Vee type, coupled to the support means for cooperating with the cylindrical surface of the workpiece, the reference means defining a geometrical longitudinal axis; measuring means including two movable arms arranged substantially along a longitudinal direction, two feeler elements coupled respectively to ends of the movable arms and movable with these ends along two opposite directions for contacting the workpiece, and transducer means associated with the movable arms for providing a signal depending on the mutual distance between the feeler elements; and protective devices fixed to the support means for protecting, in particular, the measuring means, wherein the protective devices include two half shells defining an envelope with a front surface, a rear surface and two external side surfaces, for protecting the measuring means from impacts substantially along said opposite directions and from impacts substantially along directions perpendicular to said opposite directions and to said geometrical longitudinal axis.

22. The snap gauge according to claim 21, wherein the measuring means include a substantially U-shaped integral member having a support base, two resiliently deformable portions defining relevant rotation axes and two legs defining said movable arms, the movable arms being rotatable about said rotation axes, said wherein the half-shells have substantially a U-shape, the integral member is arranged between the front surface and the rear surface of said envelope, and the movable arms are arranged next to the side surfaces of the envelope.

23. The snap gauge according to claim 22, wherein the protective devices include a substantially U-shaped first protective element having two legs adjacent to and arranged internally with respect to the movable arms for protecting the movable arms from impacts which would displace the movable arms apart from each other.

24. The snap gauge according to claim 23, wherein said legs of the first protective element have bent ends arranged longitudinally apart from said ends of the movable arms for protecting the movable arms and the feeler elements from impacts along a direction parallel to said longitudinal axis.

25. The snap gauge according to claim 24, wherein the feeler elements are adjustably fixed to the movable arms and the envelope defined by said half shells has openings in correspondence with said side surfaces, for permitting access to and adjustment of the feeler elements.

26. A snap gauge according to claim 24, wherein the support means include an intermediate element arranged between and coupled to the integral member and the first protective element, the intermediate element, the integral member and the first protective element being obtained from relevant bent flat rods of steel.

27. A snap gauge according to claim 26, wherein said half sheels are removably coupled to the base of the integral member, to the intermediate element and to the first protective element, the half-shells being made of plastic material.

28. A snap gauge according to claim 26, wherein said reference means are adjustably coupled to the intermediate element, for adjustment along said geometrical longitudinal axis and the integral member, the intermediate element and the first protective element are substantially arranged between the front surface and the rear surface of said envelope, these surfaces being shaped to permit insertion of the reference means onto the workpiece and the adjustment of the reference means.

29. A snap gauge according to claim 24, wherein said protective devices include two additional protective elements adjustably coupled to the bent ends of the first protective element, for adjustment substantially along said opposite directions, the additional protective elements defining surfaces for facilitating the insertion of the gauge onto the workpiece, the first protective element and the additional protective elements defining holes for the passage of the feeler elements.

30. A snap gauge according to claim 29, wherein the envelope defined by the half shells defines two end bases, substantially open, arranged next to and externally with respect to said ends of the movable arms, and a third base opposite to said two end bases, and wherein the support means include a handle fixed to the third base of said envelope.

* * * * *